Patented Aug. 8, 1933

1,921,868

UNITED STATES PATENT OFFICE 1,921,868

METHOD OF MELTING NONFERROUS METALS

George Septimus Evans, Bronxville, N. Y., assignor to The Mathieson Alkali Works, New York, N. Y., a Corporation of Virginia No Drawing. Application January 21, 1931
Serial No. 510,282

1 Claim. (Cl. 75—22.5)

This invention relates to the melting and refining of non-ferrous metals, such as brasses and the like, and is concerned more particularly with a novel method of melting and refining such metals which affords numerous advantages over the methods commonly employed heretofore. The new method appears to produce its best results when practiced in an electric furnace of the induction type and will be described in detail in connection with such a furnace for purposes of illustration, though it is to be understood that the utility of the invention is not limited to any specific type of furnace.

In melting non-ferrous metals, such as brasses, loss of metal or shrinkage of the charge during the melting and heating period is an important factor in the cost of operation, especially in connection with yellow brasses of high zinc content, and reduction of shrinkage is a problem of great consequence in this field. For melting such metals, the electrical induction furnace may be used to greater advantage than crucible furnaces and electrical furnaces of other types since it is so constructed that there is less metal loss than in other types of melting equipment, but even with the induction furnace, the loss of metal in melting represents a substantial item of cost. Such furnaces have the objectionable feature, however, that in the course of time, the lining has a tendency to build up or bridge and this requires that the furnaces be retired from service periodically so that the accumulated material adhering to the lining can be chipped out. In some installations, the furnaces are chipped out once in twenty-four hours, while in others the operation is not required oftener than once in four to six days, the intervals depending on the character of the operations, the kind of metal being melted, etc. In any case, the idle time of the furnace and the labor charge for chipping involves considerable expense, and there is always a likelihood of damage to the furnace lining during chipping.

My invention is accordingly directed to a new method of melting by which loss of metal and heat loss due to radiation is greatly reduced, and in the practice of this method, the life of the furnace lining is lengthened due to the substantial prevention of accumulations of material thereon and reduction of the frequency of chipping. By reason of the saving of metal and of heat, and the substantial reduction in the idle time of the furnace, and for other reasons to be explained, the new method affords important economies in operation.

The new method involves the introduction into the furnace of a small quantity of sodium carbonate, preferably in the form of fused soda ash of great purity and cast in the form of pigs, so proportioned in amount with respect to the weight of the charge of metal as to produce a semi-dry or pasty blanket over the surface of the molten metal bath. When the soda ash is added in the proper proportions, the blanket formed is dry in appearance on its upper surface and liquid in the plane of contact with the molten metal. The blanket is fairly impervious and serves to protect the surface of the metal and prevent loss of heat from the bath to the atmosphere by radiation, and since it is in effect semi-liquid, it reduces the loss of metal due to volatilization by increasing the vapor pressure at the surface of the metal.

A blanket of soda ash of the type described when used in an induction furnace in connection with the melting of brass, may be formed by adding a small quantity of soda ash, varying in weight for instance, from 0.1% to 0.4% of the metal charge, either to the pool of metal remaining in the furnace after the pour or to the charge of metal as the latter is made up, in which event, the soda ash will be introduced into the furnace upon the pool with the charge. For convenience in handling and to avoid dusting, the soda ash is preferably in pig form and a 2 lb. pig may be added with the charge. If desired, small amounts of charcoal and low melting point salts, such as sodium chloride, borax, etc., and other additions may be used with the soda ash in accordance with the character of the charge and the method of operation, although in some cases, the soda ash is preferably used alone without charcoal, salt, or other additions.

I am aware that it has been proposed in the past to employ coverings over the bath including charcoal, salt, borax and other additions proportioned in accordance with the character of the material being melted and the methods of operation. Certain of these additions may be dirt which is introduced with the charge and dross formed during the melting and heating period. So far as I am aware, it has always been the practice in melting operations in which such materials are used to skim them off at the conclusion of the heat and before the metal is poured. The skimming operation consumes considerable time and, as is well known, substantial quantities of entrained metal particles and metallic oxides are lost in the skimmings, varying from small amounts up to 60% of the total weight of the skimmings in some instances. It is evident therefore that the prior methods involving the introduction of materials to form a blanket and the skimming of that blanket whenever the metal is to be poured are not entirely satisfactory.

It is a feature of my method that when charcoal is used with the soda ash, the amount used is reduced to one-third or less of the quantity formerly used and I likewise reduce or eliminate entirely the use of salt. Also, when a soda ash blanket is provided on the bath in accordance with my invention, the slag may advantageously remain from for five to nine heats, for example, thus effecting a saving in the material used in the blanket and a material reduction in the amount of metal lost in the skimmings and in furnace time lost during skimming, and also reducing the labor charge for skimming.

I have found that when soda ash is employed as described in connection with melting brass metals in an electric induction furnace, such as the well known Ajax-Wyatt, the total quantity by weight and volume of the blanketing material required is much less than when the former materials are employed. While borings and dirty material require increased amounts of soda ash and a larger volume of slag is formed, the amount of slag formed under any given set of conditions is greatly reduced when a soda ash blanket is used. For example, in melting brass metal for rolling mill operations using a high percentage of flat and miscellaneous brass and copper scrap, it was found that the slag did not require skimming for every heat and could be allowed advantageously to build up on the bath from heat to heat for from five to nine heats. When melting mixtures consisting of a high percentage of borings or exceptionally dirty scrap, larger amounts of soda ash are required, and in this case and others of an unusual character in which the amount of dross formed is higher than in ordinary operations, skimming operations are necessarily more frequent and may be required with each heat. Also in starting up melting operations or after each complete skim, it is customary to use an approximately double quantity of soda ash in the first heat and reduced amounts on subsequent heats.

As examples of the improved results obtained in melting operations carried on in accordance with my invention the following may be given:

In melting operations with electric induction furnaces of 800 lbs. operating capacity, it was found by actual measurement that when a covering of charcoal and salt was used, the weight of the skimmings averaged 178 lbs. per furnace per day and the metal content of the skimmings averaged 28% by analysis. By employing about 1½ lbs. of fused soda ash as previously described and by reducing the weight of charcoal to slightly less than one-third or to about 1½ lbs. to 2 lbs. per charge of 800 lbs. of metal, the total quantity of slag formed was reduced to an average weight of 47 lbs. per furnace per day and showed an average metallic content of only 12% by analysis. In this operation, therefore, the weight of skimmings per furnace day was reduced by more than 73% and the loss of metal going out in the skimmings per furnace day was reduced by over 88½%.

In another operation with a capacity of 3 to 5 million pounds of metal melted per week, involving melting a high percentage of light scrap, it was found that by eliminating the charcoal entirely and using soda ash as described, the skimmings were reduced to about ⅛ of the amount formerly obtained and the average increase in yield of ingot metal per 800 lb. charge amounted to 15 lbs. per heat, representing a saving of about 2% of clean usable metal.

The results obtained in the operations described demonstrate the value of the fused soda ash slag in actual practice in reducing the loss of metal going out in the skimmings and preventing volatilization. The blanket acts to desulphurize the metal, prevents oxidation loss, removes silicious oxides, and in the presence of carbon, reduces oxides of tin, copper, and lead. It also removes films of dirt and oxides and thus promotes heat transfer to the metallic mass, by increasing the heat conductivity through the mass. The melting of borings and light scrap is somewhat difficult due to the lightness of the pieces of metal and the difficulty is increased when the metal is dirty. When a blanket of soda ash is used and provided by placing the material on top of the charge, it melts, flows down through the mass and speeds up the melting operation by producing the effects mentioned. Also, the blanket has a scrubbing action at the surface of the metal bath, and absorbs or entrains particles washed out of the bath and retains them, thus clearing up the metal.

The blanket of soda ash also increases the furnace efficiency by reducing heat loss by radiation at the surface of the bath and by increasing the heat conductivity through the charge. This reduces the heat loss, and when the blanket is properly used and proportioned with respect to the weight of the charge, it overcomes or reduces building up as well as corrosion of the lining and thus reduces the idle time, the cost of chipping and the danger of injury to the lining in that operation.

Preferably the blanket remains in place for several pourings and no difficulty is encountered in providing a blanket which remains in place while the metal is poured from beneath it.

I claim:

In a method of melting metals of the brass type in an electric induction furnace, the step of introducing soda ash into the furnace with the charge in the proportions of from about 0.1% to 0.4% of the metal charge to produce a slag covering which is molten in the plane of contact with the metal and dry on its upper surface.

GEORGE SEPTIMUS EVANS.